United States Patent [19]

Takekoshi

[11] 4,302,575

[45] Nov. 24, 1981

[54] HEAT CURABLE POLYIMIDES

[75] Inventor: Tohru Takekoshi, Scotia, N.Y.

[73] Assignee: General Electric Company, Schenectady, N.Y.

[21] Appl. No.: 107,173

[22] Filed: Dec. 26, 1979

[51] Int. Cl.$^3$ .............................................. C08G 73/12
[52] U.S. Cl. ................... 528/185; 260/33.8 R; 260/33.8 UA; 260/37 N; 264/331.19; 428/435; 428/450; 428/458; 528/26; 528/188; 428/473.5
[58] Field of Search .................... 528/185, 26, 188

[56] References Cited

U.S. PATENT DOCUMENTS

| | | | |
|---|---|---|---|
| 3,528,950 | 9/1970 | Lubowitz | 528/353 |
| 3,781,249 | 12/1973 | Lubowitz | 528/353 |
| 3,842,143 | 10/1974 | Winter | 528/353 |
| 3,847,867 | 11/1974 | Heath et al. | 528/185 |
| 4,017,511 | 4/1977 | Williams | 528/185 |
| 4,075,171 | 2/1978 | D'Alelio | 528/185 |
| 4,168,630 | 9/1979 | D'Alelio | 528/185 |

*Primary Examiner*—Howard E. Schain
*Attorney, Agent, or Firm*—William A. Teoli; James C. Davis, Jr.

[57] ABSTRACT

Polyetheramide acids and polyetherimides derived therefrom are provided having terminal aliphatically unsaturated groups. The polyetherimides are heat curable, have superior flow characteristics prior to cure, and can be converted to high strength shaped composites when reinforced with various materials such as carbon fibers, glass fibers, etc.

8 Claims, No Drawings

HEAT CURABLE POLYIMIDES

BACKGROUND OF THE INVENTION

The present invention relates to polyetheramide acid and polyetherimide compositions having terminal aliphatically unsaturated end groups. Prior to the present invention, as shown by Heath et al U.S. Pat. No. 3,847,867, assigned to the same assignee as the present invention, polyetherimides were provided by effecting reaction between certain aromatic bis(etheranhydride) and organic diamine. The polyetherimides could be reinforced with fillers to produce high performance composites. The polyetherimides of Heath et al have valuable flow characteristics as distinguished from conventional polyimides which are intractable upon conversion to the polyimide state. However, in particular applications requiring toughness and the ability to form a thermoset as distinguished from a thermoplastic, the polyetherimides of Heath et al do not possess the required chemical functionality which are often needed in making high strength composites or tough flexible films.

Attempts to achieve a suitable balance in processability and good mechanical properties in polyimides are shown by Lubowitz U.S. Pat. Nos. 3,528,950 and 3,781,241, based on the use of organic dianhydrides, such as benzophenone tetracarboxylic acid dianhydride and organic diamine, such as methylene dianiline in combination with specific endcapping monoanhydrides. An additional effort is shown by Winter U.S. Pat. No. 3,842,143 based on the use of amine terminated polyimides in combination with reactive polyolefinic compounds. According to Winter, the polyolefinic compounds were separately synthesized and when added to the amine terminated polyimide, there was effected a lowering of the softening temperature. The various procedures provided by the prior art to make processable thermosetting polyimides were often based on complicated synthetic techniques and the resulting thermosets were often deficient in ease of processability.

STATEMENT OF THE INVENTION

The present invention is based on the discovery that polyetherimide prepolymers having terminal aliphatically unsaturated end stopping groups can be prepared in a direct manner by effecting reaction between an aromatic bis(ether anhydride) defined hereinafter, an organic diamine and an aliphatically unsaturated monoanhydride, such as maleic anhydride, 3,6-endomethylene-1,2,3,6-tetrahydrophthalic anhydride, etc., in the presence of a dipolar aprotic solvent, or under interfacial polyaddition involving the use of an organic solvent reactant solution and an aqueous reactant solution.

The heat curable compositions of the present invention comprise polyetherimide having terminal aliphatically unsaturated groups of the formulas,

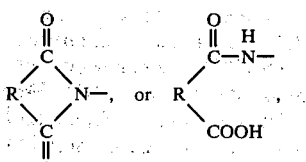

which consist essentially of chemically combined units selected from

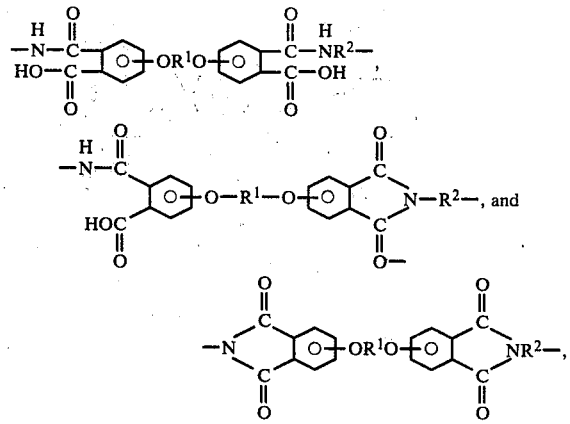

and mixtures thereof, where R is a divalent aliphatically unsaturated organo radical selected from hydrocarbon radicals and halogenated hydrocarbon radicals, $R^1$ is a $C_{(6-30)}$ divalent aromatic organic radical and $R^2$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula,

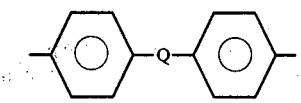

where Q is a member selected from the class consisting of —O—,

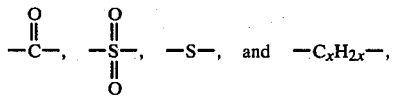

and x is a whole number from 1 to 5 inclusive.

Included by the R of the above formulas are radicals of the formulas,

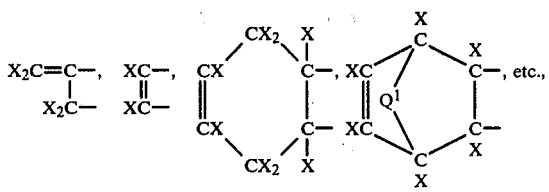

where $Q^1$ is selected from —O—, or —$CX_2$— and X is selected from hydrogen, lower alkyl such as methyl, ethyl, propyl, butyl, and mixtures of such radicals.

Radicals included by $R^1$ of the above formulas are, for example,

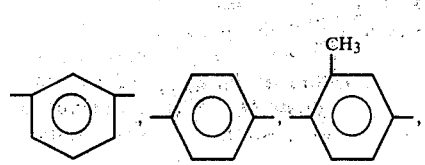

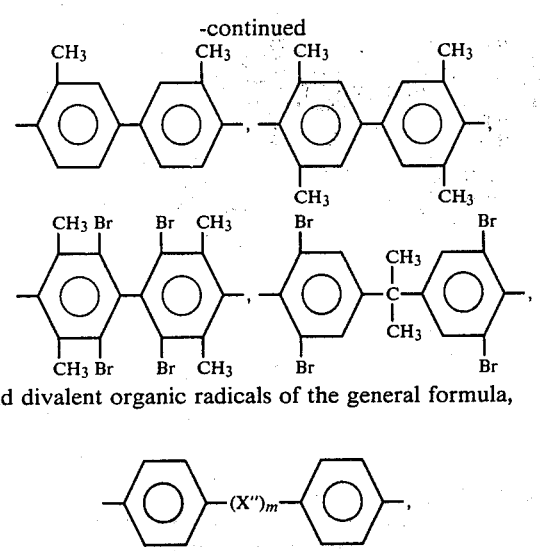

and divalent organic radicals of the general formula,

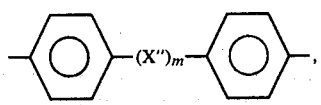

where X″ is a member selected from the class consisting of divalent radicals of the formulas —$C_{y'}H_{2y'}$—,

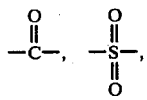

—O—, and —S—, where m is 0 or 1, y′ is a whole number from 1 to 5.

The heat curable polyimides of the present invention can be made by effecting reaction between aromatic bis(ether anhydride) of the formula,

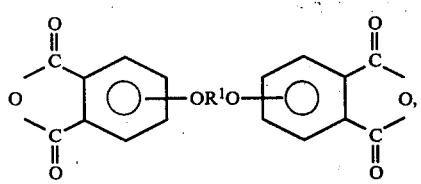 (1)

organic diamine of the formula,

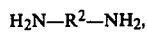 (2)

and aliphatically unsaturated anhydride

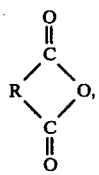 (3)

in the presence of dipolar aprotic organic solvents, or under interfacial polymerization conditions, where R, $R^1$ and $R^2$ are as previously defined.

Aliphatically unsaturated monoanhydrides of formula (3) which can be used in the practice of the present invention, include, for example, maleic anhydride, citraconic anhydride, nadic anhydride, bicyclo[2,2,1]hept-5-ene-2,3-dicarboxylic anhydride. There are included within formula (1), aromatic bis(ether anhydride)s, such as 1,3-bis(2,3-dicarboxyphenoxy)benzene dianhydride;
1,3-bis(3,4-dicarboxyphenoxy)benzene dianhydride;
1,4-bis(2,3-dicarboxyphenoxy)benzene dianhydride;
1,4-bis(3,4-dicarboxyphenoxy)benzene dianhydride;
2,2-bis[4-(2,3-dicarboxyphenoxy)phenyl]propane dianhydride;
2,2-bis[4-(3,4-dicarboxyphenoxy)phenyl]propane dianhydride;
4,4′-bis(2,3-dicarboxyphenoxy)diphenyl sulfide dianhydride;
4,4′-bis(3,4-dicarboxyphenoxy)diphenyl sulfide dianhydride;
4,4′-bis(2,3dicarboxyphenoxy)diphenyl ether dianhydride;
4,4′-bis(3,4-dicarboxyphenoxy)diphenyl ether dianhydride; etc.

Included by the organic diamines of formula (2) are, for example,
m-phenylenediamine;
p-phenylenediamine;
4,4′-diamonodiphenylpropane;
4,4′-diamonodiphenylmethane; benzidine;
4,4′-diaminodiphenyl sulfide;
4,4′-diaminodiphenyl sulfone;
4,4′-diaminodiphenyl ether;
1,5-diaminonaphthalene;
3,3′-dimethylbenzidine;
3,3′-dimethoxybenzidine;
2,4-diaminotoluene; 2,6-diaminotoluene;
2,4-bis(β-amino-t-butyl)toluene;
bis(p-β-methyl-o-aminopentyl)benzene;
1,3-diamino-4-isorpopylbenzene;
1,2-bis(3-aminopropoxy)ethane;
m-xylylenediamine;
p-xylylenediamine;
bis(4-aminocyclohexyl)methane;
decamethylenediamine;
2,2-dimethylpropylenediamine;
octamethylenediamine;
1,4-cyclohexanediamine;
1,12-octadecanediamine;
hexamethylenediamine;
heptamethylenediamine;
nonamethylenediamine;
bis(3-aminopropyl)tetramethyldisiloxane, etc.

The heat curable polyimides of the present invention can be used as coatings and laminates and when prepared under interfacial polymerization conditions can be used as heat curable solid powders having an indefinite shelf life the heat curable compositions of the present invention also can be made into solvent resistant coating compositions by exposure to high energy electron irradiation or by curing with peroxides and heat. The heat curable polyimides also can be blended with organic polymers, for example, polyvinylchloride, polyphenyleneoxide, polypropylene, polysulfones, polysulfone ethers, epoxy resins, phenol-formaldehyde resin, polystyrene, polyurethanes, etc.

The heat curable polyimides of the present invention can be cured by heating at a temperature in the range of from 200° C. to 300° C. or can be cured with organic peroxides urilized at from about 0.01% to about 5% by weight based on the total weight of the blend of the organic peroxide and the heat curable polyimide. Suitable organic peroxides are, for example, dicumyl peroxide, benzoyl peroxide, tertiary butyl perbenzoate, etc.

In the practice of the invention the heat curable polyimides can be made by effecting reaction between the aromatic bis(ether anhydride) or "ether dianhydride", the organic diamine and the unsaturated monoanhydride in the presence of a dipolar aprotic solvent at ambient temperatures. There are included, for example, N,N-dimethylformamide, N-methylpyrrolidone, N,N-dimethylacetamide, etc. Depending upon the molecular weight of the polymer desired which is in the form of a polyamide acid, more or less of the unsaturated monoanhydride can be utilized in combination with the ether anhydride. Preferably, there can be employed substantially equal molar amounts of organic diamine and organic anhydride, which can consist from 0.2 to 2 moles of the unsaturated monoanhydride per mole of the ether dianhydride. A typical polyamide acid reaction mixture, for example, which could be used to prepare a polymer having approximately 1600 molecular weight would be to use from 0.8 to 1.2 moles of the aliphatically unsaturated anhydride, per mole of the ether dianhydride utilized with the organic diamine where the resulting mixture had substantially equal molar amounts of anhydride and amine.

An alternative procedure for making the heat curable polyimides of the present invention is by interfacial addition whereby the organic anhydride reactants are contacted as a nonpolar organic solvent solution with the organic diamine in an aqueous solution. As shown in my copending application Ser. No. 37,438, filed May 9, 1979, now abandoned, and assigned to the same assignee as the present invention, polyetheramide acid precipitates immediately as it is formed, organic solvents which can be utilized to effect the interfacial polymerization of the organic diamine and the mixture of aliphatic unsaturated anhydride and ether dianhydride include, for example, methylene chloride, chloroform, toluene, etc. The resulting interfacial polymerization mixture results in the production of a slurry of polyamide acid reaction product, organic solvent and water. The organic solvent can thereafter be removed by stripping with an inert gas along with heating. The resulting aqueous slurry can then be further washed with water and dried under vacuum.

In order that those skilled in the art will be better able to practice the invention, the following examples are given by way of illustration and not by way of limitation. All parts are by weight.

EXAMPLE 1

A mixture of 90.902 parts of 2,2-bis[4-(3,4-dicarboxyphenoxy)-phenyl]propane dianhydride, 3.807 parts of maleic anhydride and 350 parts of methylene chloride was stirred under nitrogen. An aqueous solution of 20.986 parts of metaphenylenediamine and 500 parts of water was added dropwise to the methylene chloride solution over a period of 15 minutes. A lightly greenish-yellow precipitate formed and the mixture became a thick slurry. The slurry was stirred for 4 hours and heated under a stream of nitrogen to evaporate the methylene chloride. The resulting aqueous slurry was heated to 55° C. over a period of 40 minutes. The slurry was then filtered. A precipitate was washed with water and dried under vacuum. There was obtained 114.6 parts of product. Based on method of preparation, the product was a low molecular weight polyamide acid consisting essentially of chemically combined units of the formula,

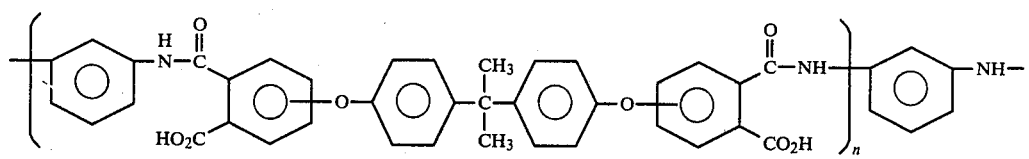

having terminal units of the formula

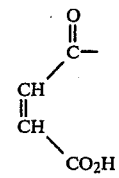

A blend of 50 parts of the above polyamide acid and 50 parts of glass fiber was dry milled and thereafter heated at 220° C. in a 3"×3" mold and then press cured at a maximum pressure of 200 psi at a temperature up to 300° C. for one hour. The resulting glass reinforced slab was found to have a flexural strength of 30×10³ psi and a flexural modulus of 1.5×10⁶ psi.

Approximately 25 parts of the above polyamide acid was mixed in a Brabender mixer maintained at 225° C. The torque increased to approximately 2000 meter-gram in 7.5 minutes. There was obtained a transparent amber product which was taken out of the bowl and allowed to cool. The product was soluble in common solvents, such as methylene chloride, chloroform, and phenolic solvents. The intrinsic viscosity measured in chloroform was 0.25 dl/g. The resulting elemental analysis was C 73.7%; H 4.2%; N 5.6% against the calculated value for C 378; H 224; N 22; O 64; Found C 74.2%; H 4.0%; N 5%. Based on method of preparation, the product was an oligomide consisting essentially of the following chemically combined units:

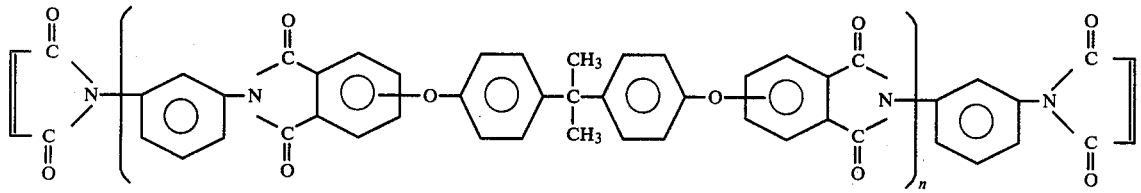

where an average value of n is ten.

Twenty percent methylene chloride solution of the above oligomide was spread on an aluminum surface and cured at 300° C. A strong tough coating was formed.

EXAMPLE 2

A mixture of toluenediamine (7.33 parts) and N-methylpyrrolidone (34 parts) was stirred and heated at 80° C. under nitrogen to form a homogeneous solution. 4,4'-Bis(3,4-dicarboxyphenoxy)diphenyl sulfide dianhydride (20.42 parts), 7-oxabicyclo[2,2,1]-hepta-5-ene-2,3-dicarboxylic anhydride (6.65 parts) and toluene (25 parts) were added to the above diamine solution. The resulting mixture was stirred and heated to reflux (140° C.) for 2.5 hours during which time the water formed was removed as an azeotrope. The resulting yellow solution could be applied directly to coating of wires and metal surfaces, etc. A part of the above polymer solution was added into methanol and stirred in a blended. The light yellow precipitate was filtered and dried. The product was an oligoimide of the following chemical structure:

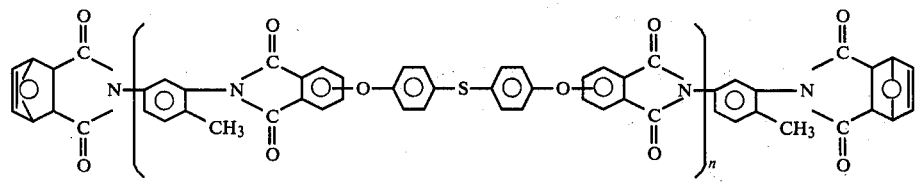

where an average value of n is 2. The oligoimide had a glass transition temperature of 174° C. and an intrinsic viscosity of 0.093 dl/g as measured in chloroform.

Glass cloth (six thousandths of an inch thick) was impregnated with the above toluene/NMP solution of the oligoimide. Six circular (2 inch diameter) prepregnated glass cloth were placed in a mold and preheated at 200° C. for 20 minutes and then press molded at 250° C. It was further post-cured at 300° C. for one hour under a pressure of 250 psi. The resulting laminate had a flexural strength of $45 \times 10^3$ psi and a flexural modulus of $2.8 \times 10^6$ psi.

EXAMPLE 3

A mixture of methylene dianiline (14.87 parts), 4,4'-bis[4(2,3-dicarboxyphenoxy)phenyl]propane dianhydride (26.02 parts), 5-norbornene-2,3-dicarbonyl anhydride (8.21 parts) and o-dichlorobenzene (78 parts) was stirred and heated to reflux for 75 minutes during which time the water was removed azeotropically. The resulting solution was poured into methanol and stirred vigorously in a blender. The precipitate of the oligoimide was filtered, washed with methanol and dried. The yield was 46.5 parts (98%). The resulting powder of the oligoimide had an intrinsic viscosity of 0.105 dl/g in chloroform and a glass transition temperature of 150° C. The oligoimide sintered at 150°-160° C. and was fluid at 170°-190° C.

Copper wire (40 mil) was dipped in a 30% m-cresol solution of the above oligoimide and dried in an oven at 120° C. It was then heated up to 350° C. over a period of one hour. The coated wire had a cut-through temperature of greater than 300° C.

A mixture of benzophenonetetracarboxylic dianhydride (7.38 parts), 4,4'-methylenedianiline (6.81 parts), norbornene-2,3-dicarboxyl anhydride, (3.75 parts), xylene (28.1 parts) and phenol (17.6 parts) was stirred and heated to reflux for four hours during which time the water was removed azeotropically by use of a Dean-Stark trap. The major part of the product precipitated during the above imidization reaction. The mixture was poured into methanol. The precipitated polyimide was filtered and dried. The polyimide product was a orange-yellow powder. Unlike the corresponding material derived from bis(ether anhydride) it was insoluble in methylene chloride, chloroform and phenolic solvents. Moreover, it did not have any significant flow property below 250° C. and sintered only partially at 260°-280° C. Unlike the heat curable polyimides of the present invention, the oligoimide could not be readily processed.

Although the above examples are directed to only a few of the very many variables utilized in the practice of the present invention, the present invention is broadly directed to polyamide acid ether imide and polyether imide having terminal unsaturated units as shown above.

What I claim as new and desire to secure by Letters Patent of the United States is:

1. Heat curable polyimide compositions having improved processability at a temperature in the range of from 150° C. to 190° C. prior to curing comprising polyetherimide having terminal aliphatically unsaturated groups of the formula,

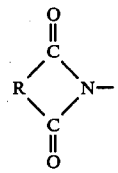

which consists essentially of chemically combined units selected from

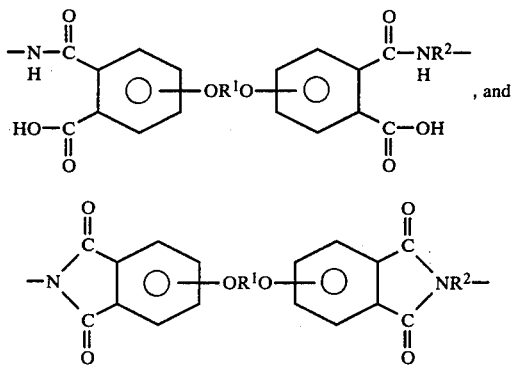

and mixtures thereof, where R is a divalent aliphatically unsaturated organo radical selected from hydrocarbon radicals and halogenated hydrocarbon radicals, $R^1$ is a $C_{(6-30)}$ divalent aromatic organic radical and $R^2$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, and (c) divalent radicals included by the formula,

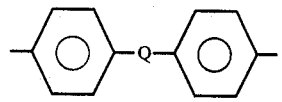

where Q is a member selected from the class consisting of

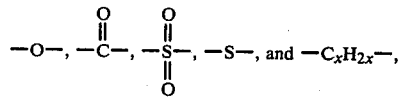

and x is a whole number from 1 to 5 inclusive.

2. A heat curable composition in accordance with claim 1, where R is

3. A heat curable composition in accordance with claim 1, where $R^1$ is

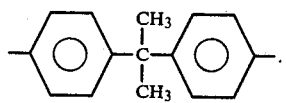

4. A heat curable composition in accordance with claim 1, where R is

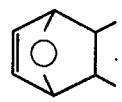

5. A heat curable composition in accordance with claim 1, where R is

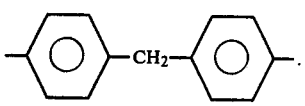

6. A heat curable composition in accordance with claim 1, where $R^2$ is

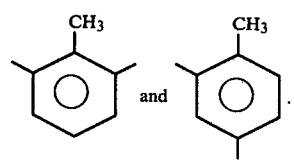

7. A heat curable composition in accordance with claim 1, where $R^2$ is a member selected from

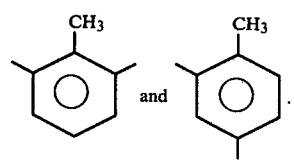

8. A heat curable composition in accordance with claim 1, where $R^2$ is

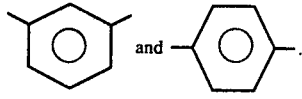

* * * * *